Jan. 23, 1968  H. S. NEWCOMER  3,365,262
CAM-OPERATED ADJUSTABLE OPTICAL SLIT
Filed Jan. 20, 1964  2 Sheets-Sheet 1

INVENTOR.
HARRY SIDNEY NEWCOMER
BY
Barthel & Bugbee
ATTORNEYS

INVENTOR.
HARRY SIDNEY NEWCOMER.
BY
Barthel & Bugbee
ATTORNEYS

—

United States Patent Office 3,365,262
Patented Jan. 23, 1968

3,365,262
CAM-OPERATED ADJUSTABLE OPTICAL SLIT
Harry S. Newcomer, P.O. Box 340,
Cape May, N.J. 08204
Filed Jan. 20, 1964, Ser. No. 338,906
16 Claims. (Cl. 350—271)

ABSTRACT OF THE DISCLOSURE

A cam-operated adjustable optical slit of simple construction and self-contained in a simple cylindrical casing has a pilot portion thereof projecting from the monochromator housing to precisely locate the slit opening axis while permitting the slit plane to be placed in the plane of the face of the monochromator body or spectrometer body. The slit jaws are moved toward one another to narrow the width of the slit by a camming action employing internal and external tapered surfaces on a cam ring and outer jaw ends respectively, so that by moving the ring axially toward the outer jaw ends, the jaws are moved toward one another to narrow the slit width, spring means being employed to urge the jaws outwardly away from one another to widen the slit when the cam ring is moved axially away from the jaw ends.

---

To adjust the slit jaws the cam ring is moved axially inward or outward by rotating a large diameter externally-threaded actuating ring connected thereto and threadedly engaging a correspondingly internally-threaded bore in the slit casing.

This actuating ring is operatively connected to an internally-toothed ring gear, both of which are rotated by a pinion inserted through a bearing hole in the casing, the cam ring being keyed to the casing to prevent it from rotating while permitting it to move axially. This construction enables the mounting of two such optical slits on opposite sides of a monochromator housing with their ring gears coaxially aligned and, for simultaneous adjustment, meshing with a pinion rod extending across the interior of the monochromator housing and out of the optical path associated with the optical axis of the slit.

Integral with the slit casing is a slit mirror housing adjustably attached so as to permit bench alignment of the mirror prior to installation of the optical slit in a monochromator housing.

Figures 1, 2:
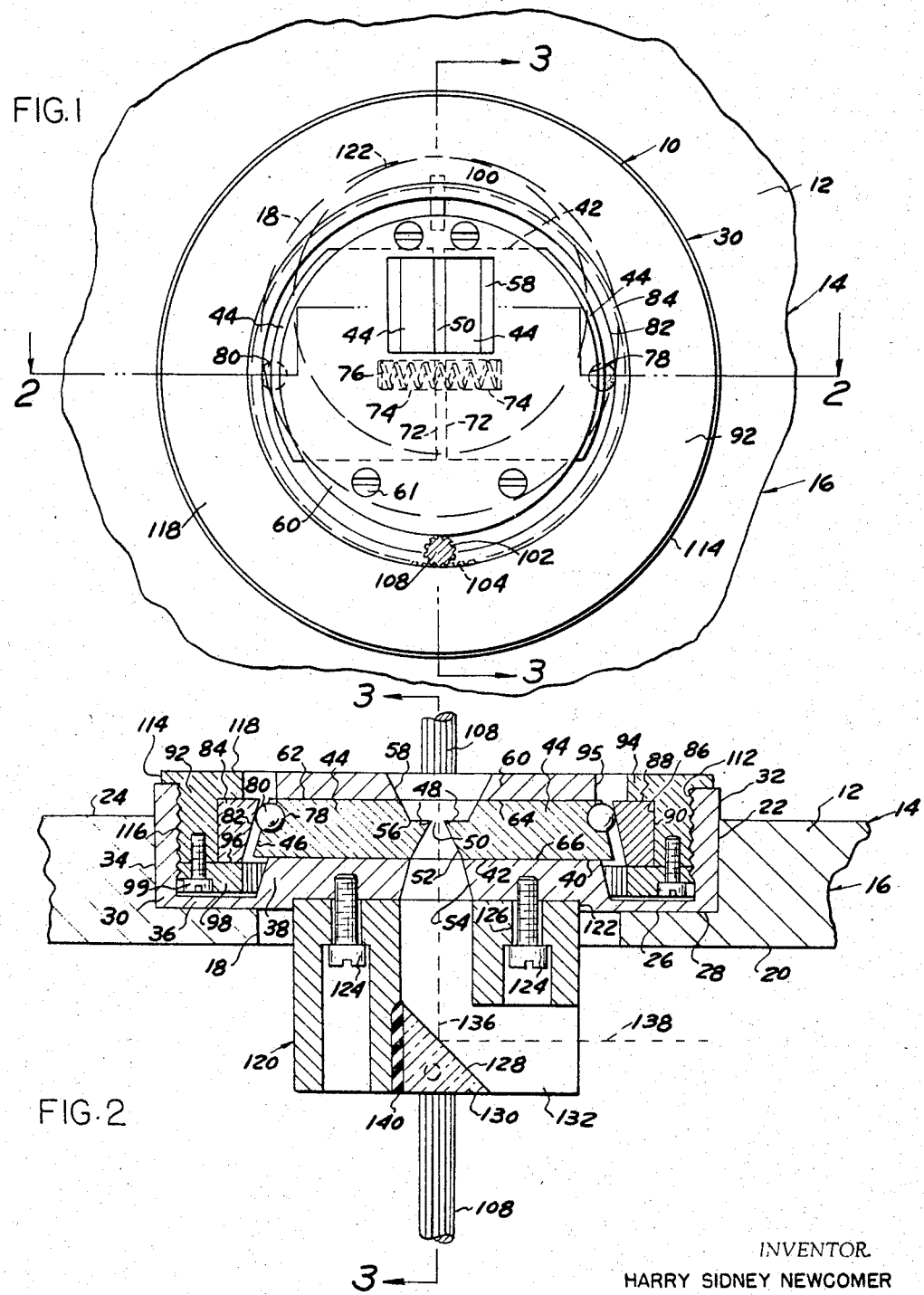
Figure 3:
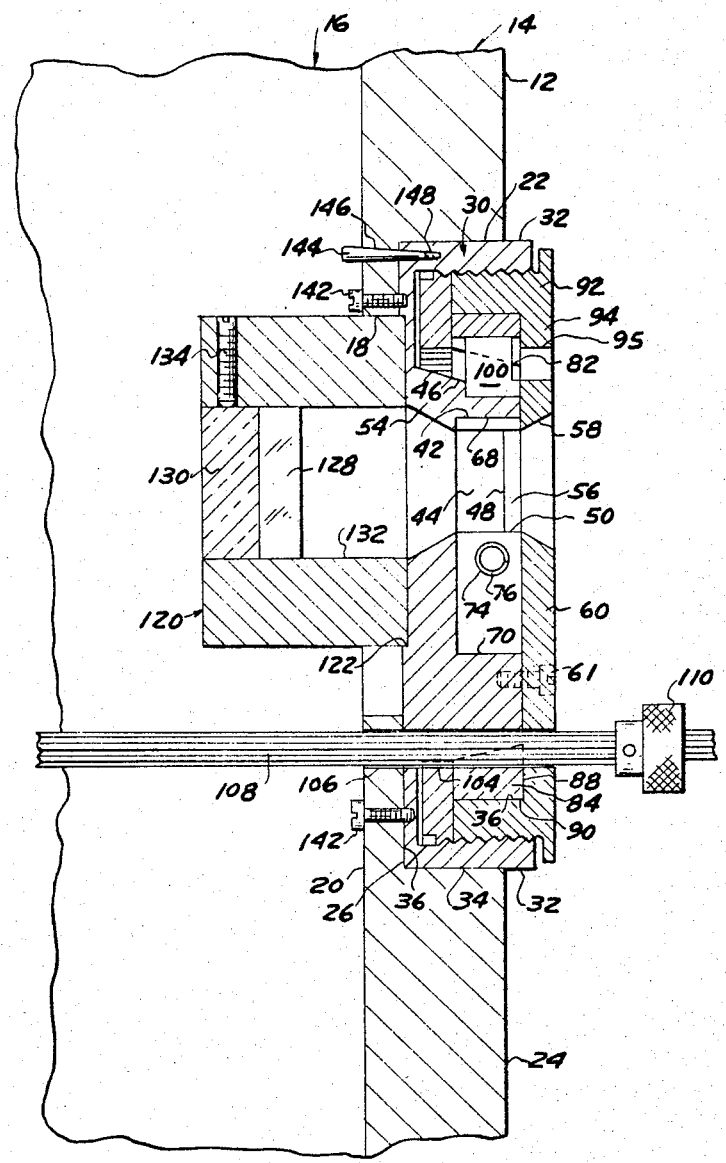

Other objects and advantages of the invention will become apparent during the course of the following description of the accompanying drawings, wherein:

FIGURE 1 is a front elevation of an adjustable optical slit according to one form of the invention;

FIGURE 2 is a horizontal section taken along the broken line 2—2 in FIGURE 1 in a plane partly in the diametral plane and partly above it and with the slit mounted in a side wall of the monochromator; and FIGURE 3 is a vertical section taken along the line 3—3 in FIGURES 1 and 2.

Referring to the drawings in detail, FIGURES 1 2, and 3 show an adjustable optical slit, generally designated 10, according to one form of the invention as mounted (FIGURES 2 and 3) in a side wall 12 of a housing 14 of a monochromator, spectrometer, spectrograph or other spectrum-producing instrument, generally designated 16, making use of such an adjustable slit device. For this purpose, the monochromator housing wall 12 is provided with a bore 18 extending outward from its inner surface 20 and opening into a counterbore 22 extending outward to the outer surface 24 of the side wall 12 and connected to the bore 18 by an annular shoulder 26 (FIGURE 2), the bore 18 being centered on the slit opening 50 and eccentrically located with respect to the bore 22 to offset the pinion 108 from the region of the light beam passing through the slit 50. The counterbore 22 with its annular bottom surface or shoulder 26 constitutes a cylindrical socket 28 in which the correspondingly cylindrical cup-shaped casing 30 of the optical slit 10 is snugly but removably seated. The casing 30 is of greater thickness than the depth of the counterbore 22 so as to possess an externally-projecting portion 32 which serves as a pilot portion or key for entering the corresponding counterbore 22 of an adjacent side wall 12 of a monochromator 14 from which the slit device 10 has been removed, in order to constitute a double monochromator.

The cup-shaped casing 30 has an annular side wall 34 (FIGURE 2) and a radial rear wall 36, the center of which is provided with an axially-extending frustoconical boss 38. The boss 38 on its inner face 40 is provided with a horizontal diametral groove 42 which serves as a guideway for a pair of slit jaws 44 of similar but opposite configuration having bevelled or conical outer end surfaces 46 and inner opposed knife-edged ends 48 bounding the opposite sides of a slit opening 50. The rearward sides of the slit jaws 44 are bevelled as at 52 and open into a flared rectangular aperture 54 in the boss 38 of the rear wall 36. The slit jaws 44 adjacent the knife edges 48 are recessed or cut back as at 56 toward a flared rectangular opening 58 in a central cover disc or circular retaining plate 60 bolted or otherwise secured by fasteners 61 to the boss 38 of the casing 30. The retaining plate 60 has a machined flat rear surface 62 which is slidably engaged by the machined flat front surfaces 64 of the jaws 44, whereas the flat rear surfaces 66 of the jaws 44 slidably engage the correspondingly flat bottom groove 42 in the boss 38, and the upper and lower 68 and 70 (FIGURE 3) of the jaws 44 engage the side walls of the groove 42.

Extending outward from the inner edges 72 of the jaws 44 beneath their knife edges 48 are two cup-shaped recesses, pockets or blind bores 74 facing one another in aligned relationship to serve as sockets for the opposite ends of a helical compression spring 76 which normally urges the opposite jaws 44 outwardly away from one another. Disposed at the intersection of the horizontal diameter of the casing 30 with the jaws 44, the conical outer edge surfaces 46 thereof are provided with spherical concave sockets 78 in which are seated bearing balls 80 bearing against the correspondingly tapered internal conical surface 82 of a cam ring 84 having its outer surface 86 and forward surface 88 seated in and slidably engaging a cup-shaped counterbore 90 in an actuating ring 92 having an inwardly-extending flange 94 with a circular opening 95 therein.

Secured to the rearward surface 96 of the actuating ring 92 is an internally-toothed ring gear 98 operatively connected as by fasteners 99 to the actuating ring 92 to rotate the latter when the ring gear 98 is rotated. The ring gear 98 also slidably engages the cam ring 84 which, however, is grooved to receive a key 100 (FIGURES 1 and 3) engaging the correspondingly-grooved casing 30 in order to permit actual sliding of the cam ring 84 while preventing rotation thereof. The rear wall 36 of the casing 30 is provided with a hole 102 in line with the teeth 104 of the ring gear 98 which is aligned with a hole 106 near the edge of the bore 18. Rotatably mounted in the hole 106 is a pinion rod 108. The pinion rod 108 meshes with the teeth 104 of the ring gear 98 and extends clear through the device 10 to the knob 110 by which it can be rotated. Consequently, when the pinion rod 108 is rotated, it rotates the ring gear 98 and with it the actuating ring 92. The actuating ring 92 is provided with an externally-threaded outer surface 112 (FIGURE 2) terminating in a knurled flange 114 by which the actuating ring 92 may be directly rotated, if desired. The threaded surface 112 is threaded into a correspondingly-threaded bore 116 in the casing 30. This thread can be of such pitch or such a multiple thread as to correlate the slit jaw movement with less than a complete revolution of the ring 92 accomplishing the maximum separation of the jaws, thus facilitating incorporation of a slit width scale on the front surface 118 of the actuating ring 92.

In the operation of the adjustable optical slit 10 of the invention, let it be assumed that it is mounted as shown in FIGURES 2 and 3 in the socket 28 of a monochromator and that it is desired to adjust the width of the slit opening 50. To do this, the operator rotates the pinion rod 108 by means of the knob 110 in one direction or the other, consequently rotating the ring gear 98 and with it the actuating ring 92. The rotation of the latter causes its threaded peripheral surface 112 to move into or out of the threaded bore 116 in the casing 30, carrying with it the cam ring 84. If the motion is such that the rotation of the actuating ring 92 is clockwise, looking toward FIGURE 1, the actuating ring 92 moves rearwardly toward the bottom wall 36 of the casing 30 and consequently the conical surface 82 of the cam ring 84 likewise moves rearwardly, pushing the balls 80 in a radially inward direction, carrying with them the slit jaws 44. As the slit jaws 44 move toward one another, the slit opening or gap 50 between the knife edges 48 decreases, narrowing the slit opening 50 to zero as the cam 84 bottoms. On the other hand, if the rotation of the ring gear 98 is counterclockwise so as to cause the actuating ring 92 to rotate forwardly out of the threaded bore 116, the consequent outward motion of the conical surface 82 of the cam ring 84 permits the jaws 44 to be moved away from one another by the helical compression spring 76, thereby widening the slit opening 50 between the knife edges 48 of the opposing jaws 44. In the drawings, the cam 84 is shown bottomed, but the slit jaws 44 are nevertheless shown slightly open for clarity.

If two such optical slits 10 are placed on opposite sides of a monochromator, as in my co-pending application Ser. No. 338,761 filed Jan. 20, 1964 for Monochromator, and if the threaded portions of the two optical slits are one right-handed, the other left-handed, then when meshed in synchronism by a connecting pin rod 108, both slit jaws will open or close together.

In the usual form of a spectrometer or monochromator, slit mirrors, if employed as they are in my co-pending application Ser. No. 338,744 filed Jan. 20, 1964, for Multiple Prism Monochromator, are usually mounted on the base plate or housing of the monochromator in adjustable relationship to the slit and the light path to the corresponding collimating mirror. This means that means must be provided for such assembly and optical adjustment by a suitable optical bench set up which involved handling of the monochromator as a whole, and if it be of box form, reaching into it with instrumentation to secure such optical alignment in plan and elevation. In this invention, I provide means for doing this before assembly in the monochromator by making it possible to mount the slit mirror on the optical slit housing and bench-adjusting it before said housing is assembled in predetermined orientation on the monochromator wall.

This can be better understood by reference to FIGURES 2 and 3 wherein 120 is a slit mirror housing of cylindrical form recessed into a cylindrical counterbore 122 in the rear face of the wall 36 and secured thereto by two fillister screws 124 in oversized holes 126, the screws being tapped into the body of the slit unit. For simplicity of mounting the front surface slit mirror 128, it is formed on the slant surface of a 45° prism 130, which prism is placed in a rectangular broached L-shaped recess or channel 132 of the mount 120 and secured therein temporarily by pressure of a set screw 134 until on bench alignment it has been given the tilt necessary to deflect the axial slit ray 136 to a predetermined angle or direction 138 with respect to the plane of the seat 26 or annular shoulder. Bonding cement is then injected behind the short leg of the prism at 140 (FIGURE 2) and the correct angulation made permanent. Final adjustment in elevation around the axis 136 can then be made, loosening the screws 124 for this purpose. Thus, those skilled in the art can much more readily adjust the slit mirror to design requirements on the separate slit assembly unit than in the more cumbersome set-up of the spectrometer or monochromator housings. The entire unit is then transferred to the monochromator housing 14 and secured in proper orientation as to jaw and mirror alignment by purely mechanical means of properly located screws 142 and a pin 144 (FIGURE 3) in tapered bores 146 and 148 in the monochromator housing wall 12 and casing 30 respectively, reference being made to the jaw knife edge 48 of the slit opening 50 as perpendicular to the horizontal plane of the monochromator as a reference position for both bench alignment and assembly.

What I claim is:

1. An adjustable optical slit for spectrum-producing instruments, comprising:
   a casing having an aperture therethrough and a recess extending laterally of said aperture,
   said casing within said recess having a guideway thereacross,
   a pair of slit jaws adjustably mounted on said guideway for sliding motion in opposite directions toward and away from one another,
   said jaws having sharp-edged inner ends aligned with said aperture and outer ends remote therefrom,
   said outer ends having contact portions thereon,
   an open-centered cam member mounted in said recess for motion perpendicular to the motion of said jaws and having an internal beveled surface engageable with said contact portion,
   resilient means engaging and urging said jaws away from one another and consequently maintaining said contact portions in engagement with said internal beveled surface,
   and an actuator engaging and adjustably moving said cam member perpendicularly to said jaws and consequently causing said internal beveled surface to push said contact portions and said jaws toward one another.

2. An adjustable optical slit, according to claim 1, wherein means is disposed between said casing and said cam member for preventing rotation of said cam member relatively to said casing.

3. An adjustable optical slit, according to claim 1, wherein said casing has an internally-threaded side wall bounding said recess, and wherein said actuator includes an annular externally-threaded rotary member threadedly engaging said internally-threaded side wall.

4. An adjustable optical slit, according to claim 3, wherein said internal beveled surface consists of a conical internal surface on said rotary member.

5. An adjustable optical slit, according to claim 3, wherein said actuator also includes a ring gear drivingly connected to said annular rotary member and a rotary pinion rotatably mounted in said casing in mesh with said ring gear.

6. An adjustable optical slit, according to claim 4, wherein said rotary member has a bore therein encircling said cam member, and wherein said cam member has an external annular surface slidably engaging the surface of said bore.

7. An adjustable optical slit, according to claim 5, wherein said ring gear is disposed within said recess and secured to the inner end of said rotary member.

8. An adjustable optical slit, according to claim 1, wherein said contact portions comprise bearing balls seated in said outer ends of said jaws.

9. An adjustable optical slit, according to claim 1, wherein said inner ends of said jaws have aligned pockets therein facing one another, and wherein said resilient means comprises a spring extending between said jaws and having its opposite end portions seated in said pockets.

10. An adjustable optical slit, according to claim 1, wherein a retaining plate is secured to said casing outwardly of said jaws in bearing engagement with said jaws.

11. An adjustable optical slit, according to claim 10, wherein said retaining plate comprises a disc closing the central portion of said recess and having an inner surface slidably engaged by said jaws.

12. An adjustable optical slit, according to claim 1, wherein said casing has a raised central portion within said recess, and wherein said guideway is disposed on said raised central portion.

13. An adjustable optical slit, according to claim 7, wherein said casing is cylindrical with substantially flat rear and front faces and wherein said sharp edged inner ends of said jaws are spaced rearwardly of said front face of said casing.

14. An adjustable optical slit, according to claim 13, wherein said front face of said casing is disposed nearer to the plane of said sharp-edged inner ends of said slit jaws then to said rear face of said casing.

15. An adjustable optical slit, according to claim 13, wherein a slit mirror mount is adjustably attached to said rear face of said casing, wherein a front surface mirror is adjustably positioned on said mount at approximately 45 degrees to said rear face, and wherein means is provided for adjusting the plane of the front surface of said mirror into parallelism with said sharp-edged inner ends of said jaws in response to rotation of said mount about an axis substantially perpendicular to said rear face of the casing, including means for adjusting the 45 degree angle to some predetermined angle more or less deviating therefrom.

16. An adjustable optical slit, according to claim 15, wherein said front surface mirror constitutes the aluminized slant surface of a 45-degree prism, wherein means is also provided for adjustably rotating said slant surface of said prism about an axis substantially parallel to said rear face of said casing, and wherein bonding material is interposed between said prism and said mount subsequent to adjustably rotating said slant surface of said prism.

No references cited.

JEWELL H. PEDERSEN, *Primary Examiner.*

W. L. SIKES, *Assistant Examiner.*